(12) United States Patent
Maeji et al.

(10) Patent No.: US 7,144,979 B2
(45) Date of Patent: Dec. 5, 2006

(54) MODIFYING THE SURFACE OF POLYMER SUBSTRATES BY GRAFT POLYMERIZATION

(75) Inventors: Nobuyoshi Joe Maeji, Wishart (AU); Geoffrey Wickham, Corinda (AU); Firas Rasoul, Westlake (AU)

(73) Assignee: Bio-Layer Pty. Limited, Queensland (AU)

( * ) Notice: Subject to any disclaimer, the term of this patent is extended or adjusted under 35 U.S.C. 154(b) by 0 days.

(21) Appl. No.: 10/451,720

(22) PCT Filed: Dec. 19, 2001

(86) PCT No.: PCT/AU01/01638

§ 371 (c)(1),
(2), (4) Date: Oct. 28, 2003

(87) PCT Pub. No.: WO02/50171

PCT Pub. Date: Jun. 27, 2002

(65) Prior Publication Data

US 2004/0220349 A1    Nov. 4, 2004

(30) Foreign Application Priority Data

Dec. 21, 2000  (AU) .................................. PR2246

(51) Int. Cl.
*C08F 6/00* (2006.01)
(52) U.S. Cl. ................ 528/480; 427/255.6; 427/411.1; 427/488; 428/374; 428/407; 442/59; 525/54.3; 525/63.71; 525/274; 525/276; 525/322
(58) Field of Classification Search ............. 427/255.6, 427/411.1, 488; 428/374, 407; 442/59; 525/54.3, 63, 71, 274, 276, 322
See application file for complete search history.

(56) References Cited

U.S. PATENT DOCUMENTS

| | | | |
|---|---|---|---|
| 3,286,009 A | 11/1966 | Yumoto et al. | |
| 4,267,202 A | 5/1981 | Nakayama et al. | |
| 5,583,211 A | 12/1996 | Coassin et al. | |
| 5,922,161 A | 7/1999 | Wu et al. | |
| 5,976,813 A | 11/1999 | Beutel et al. | |
| 6,225,368 B1 | 5/2001 | D'Agostino et al. | |
| 6,706,320 B1 * | 3/2004 | Filippou et al. | ............ 427/223 |

FOREIGN PATENT DOCUMENTS

| | | |
|---|---|---|
| EP | 0947544 | 10/1999 |
| EP | 01271084 | 5/2004 |
| WO | WO 90/02749 | 3/1990 |
| WO | PCT/AU01/01638 | 1/2002 |

\* cited by examiner

*Primary Examiner*—Terressa Boykin
(74) *Attorney, Agent, or Firm*—Adam K. Whiting; Howrey LLP

(57) ABSTRACT

The present invention relates generally to a grafting process comprising the formation of a grafted polymeric structure having a substrate polymer in hybrid formation with one or more of the same or other polymers or monomeric subunits thereof. More particularly, the present invention contemplates a method of generating a homogenous or heterogenous grafted polymer by inducing or otherwise facilitating free radical formation to initiate polymerization of monomer units corresponding to the same or different polymers to a substrate polymer previously subjected to physical stress means. The resulting hybrid polymer may comprise a substrate polymer and a population of a second or further polymers in homogenous or heterogenous hybrid formation with the substrate polymer. A homogenous population includes a grafted population of the same polymer whereas a heterogenous population comprises a grafted population of two or more different polymers. The homogenous or heterogenous population may be in a random or patterned array and may be regarded, in one embodiment, as reactive or interactive centres for solid phase organic synthesis and binding of polymeric and/or chemically interactive molecules. The present invention also discloses a method to render polymers, previously regarded as not being suitable material for graft formation, capable of receiving a graft polymer in a heterogenous or homogenous fashion. Thus, the instant invention permits the production of a new range of hybrid polymer including copolymer materials and blends of polymers.

17 Claims, 8 Drawing Sheets

MODIFYING THE SURFACE OF POLYMER SUBSTRATES BY GRAFT POLYMERIZATION

FIELD OF THE INVENTION

The present invention relates generally to a grafting process comprising the formation of a grafted polymeric structure having a substrate polymer in hybrid formation with one or more of the same or other polymers or monomeric subunits thereof. More particularly, the present invention contemplates a method of generating a homogenous or heterogenous grafted polymer by inducing or otherwise facilitating free radical formation to initiate polymerization of monomer units corresponding to the same or different polymers to a substrate polymer previously subjected to physical stress means. The resulting hybrid polymer may comprise a substrate polymer and a population of a second or further polymers in homogenous or heterogenous hybrid formation with the substrate polymer. A homogenous population includes a grafted population of the same polymer whereas a heterogenous population comprises a grafted population of two or more different polymers. The homogenous or heterogenous population may be in a random or patterned array and may be regarded, in one embodiment, as reactive or interactive centres for solid phase organic synthesis and binding of polymeric and/or chemically interactive molecules. The present invention also discloses a method to render polymers, previously regarded as not being suitable material for graft formation, capable of receiving a graft polymer in a heterogenous or homogenous fashion. Thus, the instant invention permits the production of a new range of hybrid polymer including copolymer materials and blends of polymers.

BACKGROUND OF THE INVENTION

Bibliographic details of the publications referred to by author in this specification are collected at the end of the description.

Reference to any prior art in this specification is not, and should not be taken as, an acknowledgment or any form of suggestion that this prior art forms part of the common general knowledge in Australia or any other country.

The increasing sophistication of organic synthesis including combinatorial chemistry and recombinant DNA processes is greatly facilitating research and development in the chemical and biological industries. Of particular importance are the rapidly growing industries involving diagnostic and screening processes. Such processes are useful for diagnosing a range of human and animal disease conditions or hereditary traits. Furthermore, natural product screening is now considered a fundamental approach for identifying potentially new therapeutic agents.

Central to developing diagnostic and screening processes is the need for suitable solid supports as well as matrices for combinatorial chemical processes and immunological, biochemical and/or nucleic acid interactions.

High throughput parallel synthesis and/or combinatorial chemistry approaches to compound synthesis have dramatically changed the process of identifying and optimizing drug discovery. With these methodologies, large sets of compounds are synthesized in parallel as discrete compounds or as mixtures. Methodologies include solid phase synthesis as well as solution phase processing some of which use solid phase reagents and/or scavengers as part of the synthesis process. Methods which include parallel synthesis of individual compounds are preferred over synthesis in mixtures. In terms of numbers of compounds handled in parallel, solid phase methodologies have greater advantages than solution phase methods.

There are a number of methods for the parallel synthesis of discrete compounds by solid phase methodologies. One approach is the "Split and Combine" method of synthesis. Here, large numbers of individual beads are equally divided into separate reaction vessels and each is reacted with a single different reactor. After completion of the reactions and subsequent washings to remove excess reagents, the individual resin beads are recombined and mixed thoroughly and redivided into separate reaction vessels. Reactions with a further set of reagents gives a complete set of possible dimeric sets as mixtures. The process may be repeated as required.

One example of solid phase synthesis is conducted on membranes. International Patent Publication No. WO 90/02749 discloses the use of a polymer substrate and in particular polyethylene substrate to synthesize peptides. The polyethylene substrate is generally in the form of a sheet or film to which polystyrene chains have been grafted.

High Throughput Screening (HTS) is a method where many compounds are tested in parallel for biological activity. Currently, the most widely established techniques utilize 96-well microtitre trays, where 96 independent tests can be performed simultaneously on a single plastic plate containing 96 individual wells. Parallel handling of such trays allows simultaneous testing of many thousands of individual samples. The wells of a 96-well microtitre tray can handle volumes from 50 to 500 µl. A major focus has been directed to improving HTS output by making the wells smaller to create 384- and 1536-well formats within the same microtitre plate dimensions.

In an alternative process, U.S. Pat. No. 5,976,813 describes a Continuous Format High Throughput Screening (CF-HTS). This process introduces multiple test samples into or onto a porous assay matrix. The central idea of this approach depends on separation of test samples by diffusion rather than within individual wells of a microtitre tray. As long as localization of the specific test sample is by diffusion, there will be significant variation in diffusion rate according to solvent solubility and compound characteristics. Such variations limit that accuracy of any assay readout. Furthermore, despite improvements in efficiency, CF-HTS still faces similar difficulties as in HTS.

Other examples include the use of radiofrequency plasma discharge to create functionalities such as amino groups directly onto the surface of polymers (U.S. Pat. No. 5,583, 211). More general chemical oxidation methods are also used as starting points for microcontact-based patterning.

In work leading up to the present invention, the inventors sought to generate hybrid polymers for use in a range of applications including solid phase organic synthesis as well as a solid substrate for polymer (e.g. nucleic acid molecules, amino acid chains) binding and/or chemical interaction. The hybrid polymers comprise a population of homogenous or heterogenous polymers, generally in a random or patterned array on a substrate polymer. Physical stress means is required to be applied to the substrate polymer in order to permit grafting of the population of polymers to the substrate polymer.

SUMMARY OF THE INVENTION

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

The present invention provides a grafting process to generate hybrid polymers. The grafting process comprises subjecting a substrate polymer to physical stress means such as physical movement including stretching, twisting, indenting, bending, compressing, scratching, cutting, heating and flaming to enable the substrate to receive a graft of the same or one or more other polymers or a monomeric unit thereof.

Preferably, the polypropylene polymers have a Hardness Shore "D" of from about 60 to about 80 such as for about 65 to about 75, a Flexural Modulus value of from about 600 to about 2000 Mpa such as from about 800 to about 1600 Mpa, an Impact Strength value of from about 4 to about 20 KJ/m$^2$ at 23° C., a crystallinity level of from about 50% and comprise from about 3 to about 30% copolymer, such as from about 5 to about 20%. Furthermore, the substrate polymer preferably has a Melt Flow Index of from about 1 to about 3 such as from about 4 to about 14. The thickness of the substrate polymer may be any size such as but not limited to from about 0.01 to about 3 mm and preferably from about 0.05 to about 1.5 mm. A uniform thickness is particularly useful.

The hybrid polymers of the present invention are conveniently in an array format of discrete polymers grafted to the substrate polymer at discrete sites. The present invention provides, therefore, a new range of hybrid polymers including copolymer materials and blends of polymers.

One aspect of the present invention contemplates a method for modulating a polymer or a surface or sub-surface region thereof to render said polymer or regions thereof capable of hybrid formation with the same polymer and/or one or more other polymers or monomeric precursor forms thereof, said method comprising subjecting said first mentioned polymer or its regions to sufficient physical stress means to enable said first polymer or its regions to be capable of acting as a substrate polymer for the grafting of said same or one or more other polymers or a monomeric unit thereof.

Another aspect of the present invention provides a method for generating a polymer capable of hybrid formation with the same or other polymer or monomeric precursor forms thereof such that the same or other polymers in hybrid formation are arranged in an array on the surface or sub-surface of the substrate polymer, said method comprising subjecting the substrate polymer or surface or sub-surface regions thereof to sufficient physical stress means to enable the substrate polymer or its regions to form a hybrid with the same or other polymers or monomeric units thereof.

A further aspect of the present invention contemplates a method for generating a hybrid polymer having first and second and optionally further polymers or monomeric precursor forms thereof, said method comprising subjecting said first polymer or surface or sub-surface regions thereof to sufficient physical stress means to enable said first polymer or regions thereof to act as a substrate for the grafting of said second or optionally further polymers or monomeric units thereof, contacting the treated first polymer with the second and optionally further polymers and subjecting same to conditions sufficient for the second and optionally further polymers to graft to said first polymer or regions thereof.

Still another aspect of the present invention provides a method for generating a hybrid polymer comprising a substrate polymer and a second or optionally further polymers grafted to surface and/or sub-surface regions of said substrate polymer in an array of discrete second or optionally further polymers or monomeric precursor forms thereof, said method comprising subjecting said substrate polymer or surface and sub-surface regions thereof to sufficient physical stress means to enable the substrate polymer or its regions to form a hybrid with said second or optionally further polymers or monomeric units thereof, contacting said treated substrate polymer with said second or optionally further polymers for a time and under conditions sufficient for the second or optionally further polymers to graft to said substrate polymer or regions thereof such that an array of second or optionally further polymers is generated in hybrid formation with the surface and/or sub-surface of said substrate polymer.

Yet another aspect of the present invention further contemplates a hybrid polymer comprising a first polymer in hybrid formation with a second or optionally further polymers or monomeric precursor forms thereof wherein the first polymer or surface or sub-surface regions thereof is subjected to physical stress means to render same suitable for receiving a graft of the second or optionally further polymers.

Even still another aspect of the present invention is directed to a polymeric array comprising a substrate polymer in hybrid formation with a population of discrete second or optionally further polymers or monomeric precursor forms thereof in the form of an array on the surface and/or sub-surface of said substrate polymer and wherein the substrate polymer has undergone physical stress means to render same suitable as a substrate for grafting of said second or optionally further polymers or monomeric units thereof to the surface or sub-surface of said substrate polymer.

Even yet another aspect of the present invention contemplates a method of generating an array of the same or different polymers or monomeric precursor forms thereof in hybrid formation with the surface and/or sub-surface of a substrate polymer or regions thereof wherein said substrate polymer is, under defined conditions, substantially incapable of forming a hybrid with said array of polymers, said method comprising subjecting said substrate polymer to sufficient physical stress means to render said substrate polymer or surface and/or sub-surface regions thereof capable of hybrid formation in said defined conditions with said array of polymers.

Another aspect of the present invention is directed to a polymeric array comprising an array of the same or different polymers in hybrid formation with a substrate polymer wherein said substrate polymer, under defined conditions, is incapable of forming a hybrid with said polymers until said substrate polymer is subjected to physical stress means.

A further aspect of the present invention provides a method of generating a hybrid polymer comprising an array of the same or different polymers or monomeric precursor forms thereof on the surface and/or sub-surface of a substrate polymer or regions thereof, said method comprising selecting a substrate polymer having the following properties:

an Hardness Shore "D" of from about 60 to about 80;

a Flexural Modulus Value of from about 600 to about 2000 Mpa;

an Impact Strength Value of from about 4 to about 20 kJ/m$^2$ at 23° C.;

a crystallinity level of from about 10 to about 70%; and a Melt Flow Index of from about 1 to about 30;

subjecting said substrate polymer to physical stress means to render said substrate polymer suitable to receive a graft of said same or different polymers; and then subjecting said substrate polymer and same or other polymers to conditions sufficient to permit hybrid formation.

Still another aspect of the present invention provides an array of the same or different polymers on the surface or sub-surface of a substrate polymer or regions thereof wherein said substrate polymer is selected having the following properties:

an Hardness Shore "D" of from about 60 to about 80;

a Flexural Modulus Value of from about 600 to about 2000 Mpa;

an Impact Strength Value of from about 4 to about 20 kJ/m² at 23° C.;

a crystallinity level of from about 10 to about 70%; and a Melt Flow Index of from about 1 to about 30; and wherein the substrate polymer is subjected to physical stress means to render it suitable for hybrid formation with said same or other polymers.

Yet another aspect of the present invention provides a hybrid polymer comprising a population of discrete polymers defined by the formula:

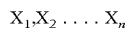

wherein $X_1, X_2 \ldots X_n$ may be the same or different and each is a polymer grafted to the surface or sub-surface of a substrate polymer at discrete regions and wherein the substrate polymer or a region thereof undergoes physical stress means to facilitate grafting of each of said $X_1, X_2 \ldots X_n$ to said surface or sub-surface of said substrate or regions thereof wherein each of said $X_1, X_2 \ldots X_n$ comprises a chemical entity bound to a reactive group according to the formula:

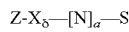

wherein

Z is a reactive group on the substrate polymer;

$X_\delta$ is any one of $X_1, X_2 \ldots X_n$;

N is a spacer and is optionally present as a 0 or 1; and

S is a chemical entity.

BRIEF DESCRIPTION OF THE FIGURES

In FIG. 3A, 3-micron features are observed. In FIG. 3B, 9-micron features are observed. For further details refer to Example 6.

DETAILED DESCRIPTION OF THE PREFERRED EMBODIMENTS

Figure 1:
FIG. 1 is a photographic representation showing staining outcomes for a polypropylene grafted in 20%, 30% and 40% styrene (STY) in the presence of a particular solvent; DCM, dichloromethane; MeOH, methanol; EtOH, ethanol; iPrOH, isopropanol; Tol, toluene; cHex, cyclohexane; n-Hex, hexane; THF, tetrahydrofluoran.

The present invention is predicated in part on the physical manipulation of a polymer to render same suitable as a substrate polymer in hybrid formation with one or more of the same or other polymers or monomeric subunits thereof or monomeric precursor forms thereof. The resulting hybrid polymer may comprise a continuous polymer including copolymer and polymer blend layer having substituents in chemical linkage with constituents on or within the substrate polymer. Alternatively, the hybrid polymer comprises a random or patterned array of discrete grafted regions comprising a polymer including copolymer region in chemical linkage with a region of the substrate polymer. With respect to this aspect, the surface of the substrate polymer may comprise a homogenous population of discrete polymers where the polymer is the same in each case or it may comprise a heterogenous population of two or more polymers in hybrid formation with a substrate population. The substrate polymer is required to be subjected to physical stress means prior to hybrid formation with the polymers to be grafted.

Accordingly, one aspect of the present invention contemplates a method for modulating a polymer or a surface or sub-surface region thereof to render said polymer or regions thereof capable of hybrid formation with the same polymer and/or one or more other polymers or monomeric precursor forms thereof, said method comprising subjecting said first mentioned polymer or its regions to sufficient physical stress means to enable said first polymer or its regions to be capable of acting as a substrate polymer for the grafting of said same or one or more other polymers or a monomeric unit thereof.

Reference herein to "modulating" includes both enhancing or otherwise promoting or reducing or otherwise inhibiting the capacity for hybrid formation. In a preferred embodiment, this aspect of the present invention enhances or otherwise promotes hybrid formation between polymers.

A "hybrid" in relation to polymers includes any association of polymers. The association may be with the same polymer or with different polymers. At least one polymer involved in hybrid formation is first subjected to physical and optionally also chemical treatment prior to being involved in the formation of a hybrid. The term "association" generally means a chemical association such as by way of a chemical bond or other linkage.

The most preferred form of hybrid polymer is a polymer that has been grafted onto another polymer. Generally, one polymer is a substrate polymer and the second polymer is grafted onto said substrate polymer. Reference to "grafting" is not to imply any limitation as to the process by which two polymers associate but conveniently, grafting can be considered a process by which radical formation is used to initiate polymerization of monomer units. Generally, but not exclusively, the polymerization of the monomeric units occurs prior to or during polymeric hybrid formation between the polymerized monomeric units and a substrate polymer.

Reference herein to a "polymer" includes a copolymer or other form of multi-polymeric material including a blend of polymers. The term "polymer" is not to be construed as excluding a copolymer or multi-polymeric material such as blends of polymers. The term "polymer" also includes natural and synthetic polymers including lipid bilayers, dextran-derived carbohydrates, polynucleotide sequences, peptides, polypeptides or proteins.

A "substrate polymer" is used in its broadest sense and includes any polymer or any point, area or other region on the surface or sub-surface of a polymer which is capable of forming an association or other form of graft with another polymer or with the same polymer. Reference to a particular point, area or other region of a polymer means that selected surface or sub-surface areas of a substrate polymer may be subjected to grafting with the same or different polymers in a random or patterned array. The term "region" includes a point or area on the surface or sub-surface of the substrate polymer.

The term "array" may or may not require the identification of a grafted polymer in terms of co-ordinates for its location. An array may be in a pattern or be random and may comprise all the same polymer (homogenous) or two or more polymers (heterogenous). The surface of a substrate polymer may be uniformly able to accept a graft polymer or different regions may be graftable or non-graftable. In either event, the preferred grafted polymer is in an array format.

Furthermore, the grafting process may occur in multiple stages where physical stress means is used to graft a first polymer to a substrate polymer and then further physical stress means used to graft subsequent polymers.

The term "physical stress means" is used in its broadest sense to include any form of pressure or force achieved by physical means. A measure of sufficient physical stress means is conveniently determined by the ability of a polymer, initially under conditions or in a form being substantially incapable of receiving a graft, to alter its characteristics to permit graft or other hybrid formation. Although not intending to limit the present invention to any one theory or mode of action, it is proposed that the physical stress alters one or more chemical bonds or spatially alters polymeric chains to permit hybrid formation with another, i.e. the same, polymer.

Examples of physical stress means include but are not limited to physical movement such as stretching, twisting, indenting, bending, scratching, cutting, heating, flaming or compression. Physical stress means also encompasses radiation-induced stress, including particle radiation such as exposure to plasma including atomic particle, vacuum U.V. and plasma discharge irradiation, ionizing radiation including γ-irradiation and electron beam irradiation, laser and U.V. irradiation and temperature radiation such as exposure to high or low levels of temperature. Physical stress means further includes ejection from a mould.

The physical stress means may be applied to the entire substrate polymer or to selected or random points or areas including regions thereof. As a result of the physical stress means process, stress may also be applied to or cause fissures, indentations or openings to sub-surface regions. Accordingly, the physical stress means is said to be applied to the substrate polymer or surface or sub-surface regions thereof. Different or multiple physical stress means may also be applied to graft heterogenous polymers to the substrate polymer.

A "region" includes a point, area or other location on the surface or sub-surface of a substrate polymer. The population of polymers grafted onto the substrate polymer occupies, in one embodiment, discrete regions onto the surface and optionally sub-surface of the substrate polymer.

In a particularly preferred embodiment, the grafting process results in an array of polymeric entities in hybrid formation with the surface and/or sub-surface of a substrate polymer. In this embodiment, the polymeric entities may be uniform with respect to each other or may comprise homozygous or heterogenous polymers. The latter occurs where there are at least two different polymeric entities in hybrid formation with the surface or sub-surface of the substrate polymer. The polymer entities may also cover the entire surface of the substrate polymer or they may be in a random or patterned array at discrete regions (i.e. points, areas or locations) on the surface and/or sub-surface of the substrate polymer.

Accordingly, another aspect of the present invention provides a method for generating a polymer capable of hybrid formation with the same or other polymer such that the same or other polymers in hybrid formation are arranged in an array on the surface or sub-surface of the substrate polymer, said method comprising subjecting the substrate polymer or surface or sub-surface regions thereof to sufficient physical stress means to enable the substrate polymer or its regions to form a hybrid with the same or other polymers or monomeric units thereof.

This aspect of the present invention relates to the physical manipulation of a substrate polymer such that it is rendered suitable as a partner in hybrid formation with the same or one or more other polymers or their monomeric units. The physical manipulation or the pre- or post-hybrid formation process may also require exposure to certain chemical conditions such as chemical solvents or other physical conditions and as radiation. All such conditions are encompassed by the present invention.

Another aspect of the present invention contemplates a method for generating the hybrid polymers and further contemplates the hybrid polymers so produced.

Accordingly, another aspect of the present invention contemplates a method for generating a hybrid polymer having first and second and optionally further polymers, said method comprising subjecting said first polymer or surface or sub-surface regions thereof to sufficient physical stress means to enable said first polymer or regions thereof to act as a substrate for the grafting of said second or optionally further polymers or monomeric units thereof, contacting the treated first polymer with the second and optionally further polymers and subjecting same to conditions sufficient for the second and optionally further polymers to graft to said first polymer or regions thereof.

As above, "grafting" in this context includes a process whereby a first polymer is brought into hybrid formation with a second or optionally further polymer.

Generally, the first polymer in this aspect of the present invention is regarded as a "substrate" polymer.

Preferably, but not exclusively, the second and optionally further polymers form discrete associations in array format on the surface and/or sub-surface of the substrate polymer.

Accordingly, another aspect of the present invention provides a method for generating a hybrid polymer comprising a substrate polymer and a second or optionally further polymers grafted to surface and/or sub-surface regions of said substrate polymer in an array of discrete second or optionally further polymers, said method comprising subjecting said substrate polymer or surface and sub-surface regions thereof to sufficient physical stress means to enable the substrate polymer or its regions to form a hybrid with said second or optionally further polymers or monomeric units thereof, contacting said treated substrate polymer with said second or optionally further polymers for a time and under conditions sufficient for the second or optionally further polymers to graft to said substrate polymer or regions thereof such that an array of second or optionally further polymers is generated in hybrid formation with the surface and/or sub-surface of said substrate polymer.

The terms "treatment", "treat" or "treating" generally refer to subjecting a polymer or group of polymers to conditions, physical or chemical, to permit a particular outcome. A "treated substrate polymer", for example, may refer to a substrate polymer subjected to physical stress means to render it suitable to participate in graft formation. Alternatively, it also may apply to physical and optionally also chemical conditions required to effect grafting including inducing polymerization of the monomeric unit during or prior to grafting to the substrate polymer. The present invention contemplates multiple treatments where a first treatment is used to graft a first polymer, a second treatment is used to graft a second polymer and so on. The multiple treatments may comprise the same or different conditions or treatments.

According to this and other aspects of the present invention, the "second or optionally further polymer(s)" includes both the same polymer as the substrate polymer or a polymer chemically, physically or functionally distinct from said substrate polymer. A "functionally" distinct polymer includes a polymer which has the same chemical constituency as the substrate polymer but has been subjected to physical or chemical conditions such that its properties (e.g. the ability to participate in graft formation) have been altered. Where a "second or optionally further polymer(s)" differs from the substrate polymer, they may comprise all the same polymers or may comprise a population of two or more different polymers.

The present invention further contemplates a hybrid polymer comprising a first polymer in hybrid formation with a second or optionally further polymers wherein the first polymer or surface or sub-surface regions thereof is subjected to physical stress means to render same suitable for receiving a graft of the second or optionally further polymers.

Generally, the first polymer is regarded as a substrate polymer.

Preferably, the second or optionally further polymers are in an array format on the surface or sub-surface of said substrate polymer.

Yet another aspect of the present invention is directed to a polymeric array comprising a substrate polymer in hybrid formation with a population of discrete second or optionally further polymers in the form of an array on the surface and/or sub-surface of said substrate polymer and wherein the substrate polymer has undergone physical stress means to render same suitable as a substrate for grafting of said second or optionally further polymers or monomeric units thereof to the surface or sub-surface of said substrate polymer.

In one embodiment, the first or substrate polymer is generally not capable of receiving a graft or one or more polymers under particular grafting conditions. This aspect of the present invention permits, therefore, the generation of a form of the polymer or surface and/or sub-surface regions thereof which can receive a graft of a second or optionally further polymers.

Accordingly, another aspect of the present invention contemplates a method of generating an array of the same or different polymers in hybrid formation with the surface and/or sub-surface of a substrate polymer or regions thereof wherein said substrate polymer is, under defined conditions, substantially incapable of forming a hybrid with said array of polymers, said method comprising subjecting said substrate polymer to sufficient physical stress means to render said substrate polymer or surface and/or sub-surface regions thereof capable of hybrid formation in said defined conditions with said array of polymers.

As stated above, an "array" includes a random or non-random pattern.

In a related embodiment, the present invention is directed to a polymeric array comprising an array of the same or different polymers in hybrid formation with a substrate polymer wherein said substrate polymer, under defined conditions, is incapable of forming a hybrid with said polymers until said substrate polymer is subjected to physical stress means.

The "defined conditions" generally means standard grafting conditions.

In a further related embodiment, the present invention contemplates the use of atomic force microscopy (AFM) to scan a polymer in order to highlight or otherwise identify particular features on the surface or sub-surface of the polymer. Such analysis permits the diagnosis of differentially-graftable surface and/or sub-surface sites of a substrate polymer. In accordance with this aspect of the invention, AFM analysis yields information concerning possibly unexpected variations in one or more of the characteristic features of a substrate polymer such as, for example, Hardness Shore and Flexural Modulus values, across the substrate polymer. Such variability may indicate optimal and/or sub-optimal sites for the grafting of a second and optionally further polymers or monomeric units thereof, whether uniformly or in the form of an array.

Furthermore, information obtained from the AFM enables conditions to be selected for differential grafting at particular sites on the polymer surface or sub-surface.

Hence, following diagnosis, a population of discrete second or optionally further polymers may be grafted preferentially to preferred sites, whether uniformly or in the form of an array.

The present invention extends to the use of any polymers as either the substrate polymer or the polymers to be grafted to the substrate polymer. In one preferred embodiment, the substrate polymer is a polyalkalene (e.g. polypropylene) including but not limited to fluorinated polyalkalenesor 1,2,2,3 tetrafluoroethylene-perfluoro (propyl vinyl ether) copolymer (PFA) are particularly preferred.

Preferably, the polypropylene polymers have a Hardness Shore "D" of from about 60 to about 80 such as for about 65 to about 75, a Flexural Modulus value of from about 600 to about 2000 Mpa such as from about 800 to about 1600 Mpa, an Impact Strength value of from about 4 to about 20 $KJ/m^2$ at 23° C., a crystallinity level of from about 50% and comprise from about 3 to about 30% copolymer, such as from about 5 to about 20%. Furthermore, the substrate polymer preferably has a Melt Flow Index of from about 1 to about 3 such as from about 4 to about 14. The thickness of the substrate polymer may be any size such as but not limited to from about 0.01 to about 3 mm and preferably from about 0.05 to about 1.5 mm. A uniform thickness is particularly useful.

As stated above, a "polymer" includes a copolymer or multi-polymer as well as blends such as but not limited to compatible blends of polymers.

Accordingly, in a particularly preferred embodiment, there is provided a method of generating a hybrid polymer comprising an array of the same or different polymers on the surface and/or sub-surface of a substrate polymer or regions thereof, said method comprising selecting a substrate polymer having the following properties:
- an Hardness Shore "D" of from about 60 to about 80;
- a Flexural Modulus Value of from about 600 to about 2000 Mpa;
- an Impact Strength Value of from about 4 to about 20 $kJ/m^2$ at 23° C.;
- a crystallinity level of from about 10 to about 70%; and
- a Melt Flow Index of from about 1 to about 30;
- subjecting said substrate polymer to physical stress means to render said substrate polymer suitable to receive a graft of said same or different polymers; and
- then subjecting said substrate polymer and same or other polymers to conditions sufficient to permit hybrid formation.

Yet another aspect of the present invention provides an array of the same or different polymers on the surface or sub-surface of a substrate polymer or regions thereof wherein said substrate polymer is selected having the following properties:
- an Hardness Shore "D" of from about 60 to about 80;
- a Flexural Modulus Value of from about 600 to about 2000 Mpa;
- an Impact Strength Value of from about 4 to about 20 $kJ/m^2$ at 23° C.;
- a crystallinity level of from about 10 to about 70%; and
- a Melt Flow Index of from about 1 to about 30; and
- wherein the substrate polymer is subjected to physical stress means to render it suitable for hybrid formation with said same or other polymers.

In a further embodiment of the present invention, any point, surface or area including region of the substrate polymer may be rendered capable of graft polymerization by any one or combination of treatments such that each individual point or individual surface or individual region or individual area may be rendered capable of graft polymerization by any one or more treatments.

In a preferred embodiment, the number of points, or size of the surface or area including region to be rendered capable of graft polymerization can be equal to the total number of points, surfaces or areas present on the substrate polymer.

In an even more preferred embodiment, any individual point, individual surface or individual area of a polymer substrate rendered capable of graft polymerization, may be grafted individually or in any combination to any monomer or combination of monomers, such that any individual point, individual surface or individual area of the substrate polymer may be grafted to a unique monomer or unique combination of monomers.

In a preferred embodiment of the invention, the surface of a substrate polymer is rendered capable of graft polymerization such that points, areas, surfaces or regions may be rendered capable of graft polymerization in any arrangement or geometrical pattern.

In an alternative embodiment, the present invention contemplates any points, areas, surfaces including regions of the polymer substrate capable of being grafted being exposed to a solution containing the monomer to be grafted and a swelling agent. The swelling agent may be selected from any suitable solvent. A solvent is any liquid phase in which reactants are dissolved, suspended or dispersed in the liquid medium. Solvents include but are not limited to polar or non-polar, protic or aprotic solvents such as hydrocarbons (e.g. petroleum ethers, benzene, toluene, isopropanol, hexane, cyclohexane), chlorinated solvents (e.g. dichloromethane, carbon tetrachloride) and other halogenated solvents including fluorogenated or bromogenated solvents such a tetrahydrofluoran), dialkyl ethers (e.g. diethyl ether), alcohols (e.g. methanol, ethanol, propanol and butanol), acetonitrile, ethyl acetate and in some cases, aqueous media including water.

In a preferred embodiment, the solution may comprise any suitable swelling agent and any monomer or mixture of monomers to be grafted to the points, areas, surfaces or regions of the substrate polymer capable of graft polymerization.

In an even more preferred embodiment of the invention, a mixture of monomers capable of forming a cross-linked structure and a porogen are placed in contact with the points, surfaces, regions or areas of a substrate polymer capable of graft polymerization. The points, surfaces, regions or areas of a substrate polymer in contact with the mixture of monomers are exposed to plasma including atomic particle, vacuum U.V. and plasma discharge irradiation, ionizing radiation including γ-irradiation and electron beam irradiation, laser and U.V. irradiation and temperature irradiation to initiate graft polymerization.

In a most preferred embodiment of the instant invention, graft polymerization of the mixture of the monomers result in the formation of a hybrid polymer, wherein points, regions, areas or surfaces of the substrate polymer rendered capable of graft polymerization are grafted to a second polymer.

In an even more preferred embodiment of the invention, the mixture of monomers capable of forming a crosslinked structure can be, but are not limited to, monomers of divinyl benzene and styrene and mixtures thereof.

In a most preferred embodiment of the invention, graft polymerization of the mixture of the monomers and porogen results in the formation of a hybrid polymer, wherein the points, areas, surfaces including regions of the substrate polymer rendered capable of graft polymerization are grafted to a substrate polymer.

In a preferred embodiment of the invention, the point or region or surface or area to be grafted is placed in contact with a solution of methanol or dichloromethane comprising about 15% to about 60% such as 40% styrene monomer such that other points or regions or surfaces or areas to be grafted may or may not be exposed to the same monomer solution. Other examples of amounts of styrene monomers include from about 20% to about 30% styrene monomers.

In a preferred embodiment, the vessel containing the substrate polymer and the monomer solution are then sealed and grafting of monomer to the sites rendered graftable is then effected by exposing the polymer to be grafted to γ-irradiation.

Most preferably, the graft polymerization is then initiated on treated surfaces by high energy ionizing radiation such as but not limited to exposure to plasma including atomic particle, vacuum U.V. and plasma discharge irradiation, ionizing radiation including γ-irradiation and electron beam irradiation, laser and U.V. irradiation and temperature irradiation in the presence of monomers comprising but not limited by one or more of styryl, (meth)acrylate and multifunctional vinyl polymerizable compounds. Polymers contemplated herein for use as substrate or grafted polymers include but are not limited herein to the use of four types:

I. Polymers which contain functional groups due to the presence of functional groups in the respective monomers, such as acrylic (or methacrylic) acid esters having a free functionality in the alcohol part of the ester function, e.g. —$(CH_2)_nCH_2$—OH, —$(CH_2—)_n$—$CH(CH_3)$—OH (n=2–10) or an active ester function such as —COOR, R being e.g. pentafluorophenyl, p-nitrophenyl, methoxymethylene or a lactone function, which directly can react with a nucleophile. Similar types of polymers can be obtained by crosslinking dialkylsihandiols or polydialkylsiloxanes, polyvinylalcohol, polyoxymethylene or polyoxyethylene with suitable crosslinking agents such as terephthaldehyde, carboxylic acid dichlorides or bisisothiocyanates.

II. Polymers in which functional groups can be introduced by chemical modifications such as crosslinked polystyrene, polysulfone containing aromatic residues, polyesters, polyamides, polyimides, polycarbonates, polyvinylacetate. Polymers with aromatic residues can be modified, e.g. Friedel-Crafts acylation followed by reduction or Grignard reaction. Other types of polymers can generate free functional groups by partial hydrolytic reactions. Polyvinylidene difluoride (PVDF) can generate functional groups (double bonds) by dehydrohalogenation.

III. Chemically inert polymers such as polysulfones, polytetrafluoroethylene (Teflon trademark), polyethylene, polypropylene, polyvinylidene difluoride (PVDF) can be activated by radiation, e.g. by exposure to plasma including atomic particle, vacuum U.V. and plasma discharge irradiation, ionizing radiation including γ-irradiation and electron beam irradiation, laser and U.V. irradiation and temperature irradiation and the generated ions or radicals used for grafting onto the surface of the polymer, chains containing monomers with functional groups according to I and/or II.

IV. Chemically inert polymers such as polysulfones, polytetrafluoroethylene (Telfon trademark), polyethylene, polypropylene, polyvinylidene difluoride (PVDF) can be coated with copolymers, which already do contain free functional groups (I) or easily transformed to generate functional groups by using conventional chemical or physico-chemical processes (II, III). Another subtype could be obtained by crosslinking, e.g. polyvinylalcohol on the surface of the aforementioned polymers, generating diradicals and use the radicals to start a grafting processing involving monomers according to I and/or II.

The hybrid polymers of the present invention are useful inter alia as solid supports for a range of applications such as but not limited to solid phase chemical synthesis, as solid matrices for anchoring nucleic acid or peptide moieties and/or as reactive centres for immunological, biochemical, enzymatic and/or chemical reactions and/or interactions.

Accordingly, another aspect of the present invention provides a hybrid polymer comprising a population of discrete polymers defined by the formula:

$$X_1, X_2 \ldots X_n$$

wherein $X_1, X_2 \ldots X_n$ may be the same or different and each is a polymer grafted to the surface or sub-surface of a substrate polymer at discrete regions and wherein the substrate polymer or a region thereof undergoes physical stress means to facilitate grafting of each of said $X_1, X_2 \ldots X_n$ to said surface or sub-surface of said substrate or regions thereof wherein each of said $X_1, X_2 \ldots X_n$ comprises a chemical entity bound to a reactive group according to the formula:

$$Z\text{-}X_\delta\text{—}[N]_a\text{—}S$$

wherein
Z is a reactive group on the substrate polymer;
$X_\delta$ is any one of $X_1, X_2 \ldots X_n$;
N is a spacer and is optionally present as a 0 or 1; and
S is a chemical entity.
Preferably, the chemical entity is one or more of a peptide, nucleic acid molecule or chemical molecule.

A range of chemical reactions may be undertaken on the hybrid polymer. Such chemical reactions include, for example:

i. [2+2] cycloadditions including trapping of butadiene;
ii. [2+3] cycloadditions including synthesis of isoxazolines, furans and modified peptides;
iii. acetal formation including immobilization of diols, aldehydes and ketones;
iv. aldol condensation including derivatization of aldehydes, synthesis of propanediols;
v. benzoin condensation including derivatization of aldehydes;
vi. cyclocondensations including benzodiazepines and hydantoins, thiazolidines, β-turn mimetics, porphyrins, phthalocyanines;
vii. Dieckmann cyclization including cyclization of diesters;
viii. Diels-Alder reaction including derivatization of acrylic acid;
ix. electrophilic addition including addition of alcohols to alkenes;
x. Grignard reaction including derivatization of aldehydes;
xi. Heck reaction including synthesis of disubstituted alkenes;
xii. Henry reaction including synthesis of nitrile oxides in situ (see [2+3] cycloaddition);
xiii. catalytic hydrogenation including synthesis of pheromones and peptides (hydrogenation of alkenes);
xiv. Michael reaction including synthesis of sulfanyl ketones, bicyclo[2.2.2]octanes;
xv. Mitsunobu reaction including synthesis of aryl ethers, peptidyl phosphonates and thioethers;
xvi. nucleophilic aromatic substitutions including synthesis of quinolones;
xvii. oxidation including synthesis of aldehydes and ketones;
xviii. Pausen-Khand cycloaddition including cyclization of norbornadiene with pentynol;
xix. photochenical cyclization including synthesis of helicenes;
xx. reactions with organo-metallic compounds including derivatization of aldehydes and acyl chlorides;
xxi. reduction with complex hydrides and Sn compounds including reduction of carbonyl, carboxylic acids, esters and nitro groups;
xxii. Soai reaction including reduction of carboxyl groups;
xxiii. Stille reactions including synthesis of biphenyl derivaives;
xxiv. Stork reactions including synthesis of substituted cyclohexanones;
xxv. reductive amination including synthesis of quinolones;
xxvi. Suzuki reaction including synthesis of phenylacetic acid derivatives; and xxvii. Wittig, Wittig-Horner reaction including reactions of aldehydes; pheromones and sulfanyl ketones.

Reference may also be made to Patel et al. (1996) who describe the manufacture or synthesis of N-substituted glycines, polycarbamates, mercaptoacylprolines, diketopiperazines, HIV protease inhibitors, 1–3 diols, hydroxystilbenes, B-lactams, 1,4-benzodiazepine-2-5-diones, dihydropyridines and dihydropyrimidines.

Reference may also be made to synthesis of polyketides as discussed, for example, in Rohr (1995).

Chemical or enzymatic synthesis of the compound libraries may also take place on the hybrid polymers.

It will also be appreciated that compounds prepared with the hybrid polymers of the present invention may be screened for an activity of interest by methods well known in the art. For example, such screening may be effected by flow cytometry as, for example, described by Needels et al. (1993).

Compounds that may be so screened include agonists and antagonists for cell membrane receptors, toxins, venoms, viral epitopes, hormones, sugars, cofactors, peptides, enzyme substrates, drugs inclusive of opiates and steroids, proteins including antibodies, monoclonal antibodies, antisera reactive with specific antigenic determinants, nucleic acids, lectins, polysaccharides, cellular membranes and organelles.

Chemical compounds further encompassed by the present invention include a plurality of unique polynucleotide or oligonucleotide sequences for sequence by hybridization (SBH) or gene expression analysis. Persons of skill in the art will recognize that SBH uses a set of short oligonucleotide probes of defined sequence to search for complementary sequences on a longer target strand of DNA. The hybridization pattern is used to reconstruct the target DNA sequence. Accordingly, in the context of the present invention, an aqueous solution of fluorescently labelled single-stranded DNA (ssDNA) of unknown sequence may be passed over the library of polynucleotide or oligonucleotide compounds and adsorption (hybridization) of the ssDNA will occur only on hybrid polymers which contain polynucleotide or oligonucleotide sequences complementary to those on the ssDNA. These hybrid polymers may be identified, for example, by flow cytometry, fluorescence optical microscopy or any other suitable technique.

The present invention also resides in a method of synthesizing and deconvoluting a combinatorial library. The method comprises:
(a) apportioning in a stochastic manner amongst one or a plurality of reaction vessels a plurality of hybrid polymers on which a plurality of different compounds can be synthesized, wherein said plurality of hybrid polymers includes a population of polymers grafted onto a substrate polymer at a discrete region on the surface or sub-surface of said substrate polymer and wherein each hybrid polymer has a code;
(b) reacting the grafted polymers in each reaction vessel with a chemical entity;
(c) pooling the hybrid polymers from each reaction vessel and iterating steps (a) through (c) as necessary to create a combinatorial compound library, wherein member compounds of the library are associated with the detectably distinct hybrid polymers.

During a reaction step, the hybrid polymers in each reaction vessel are reacted with a chemical entity required to assembly a particular compound. Assembly of compounds from many types of chemical entities requires use of the appropriate coupling chemistry for a given set of chemical entities. Any set of chemical entities that can be attached to one another in a step-by-step fashion can serve as the chemical entity. The attachment may be mediated by chemical, enzymatic, or other means, or by a combination of these. The resulting compounds can be linear, cyclic, branched or assume various other conformations as will be apparent to those skilled in the art. For example, techniques for solid state synthesis of polypeptides are described, for example, in Merrifield et al., 1963. Peptide coupling chemistry is also described in "*The Peptides*", Vol. 1 (eds. Gross, E. and Meinhofer, J.), Academic Press, Orlando (1979).

To synthesize the compounds, a large number of the hybrid polymers are apportioned among a number of reaction vessels. In each reaction, a different chemical entity is coupled to a growing chemical compound such as an oligomer chain. The chemical entity may be of any type that can be appropriately activated for chemical coupling, or any type that will be accepted for enzymatic coupling. Because the reactions may be contained in separate recation vessels, even chemical entities with different coupling chemistries can be used to assemble the compounds (see The Peptides, op. cit). The coupling time for some of the chemical entity reactions are carried out in parallel. After each coupling step, the hybrid polymer on which are synthesized the compounds (e.g. oligomers) of a library are pooled and mixed prior to re-allocation to the individual vessels for the next coupling step. This shuffling process produces hybrid polymers with many chemical combinations. If each synthesis step has high coupling efficiency, substantially all of the chemical entities on a single carrier will have the same composition.

Various aspects of the present invention may be conducted in an automated or semi-automated manner, generally with the assistance of data processing means. Computer programs and other data processing means may be used to store information of preferred polymer characteristics for use as either substrate polymers and/or polymers to be grafted to a substrate polymer. Data processing means is used to read input data covering the desired characteristics.

Alternatively, or in addition, data processing means controls the physical stress means and/or the polymerization process and/or reactions and interactions occurring in, within or between a population of polymers grafted to a substrate polymer.

Still another aspect of the present invention contemplates the use of physical stress means applied to a substrate polymer in the manufacture of a hybrid polymer between said substrate polymer and the same or one or more other polymers.

The present invention is further described by the following non-limiting Examples.

EXAMPLE 1

Methods

General Grafting Methods

Moulded plastic samples were placed into the desired solvent, which comprised a solvent and/or a mixture of monomer(s) as described in the examples below. Unless otherwise stated, the conditions of grafting were a solvent which comprised 30% styrene. Furthermore, the monomers were employed as received, without further purification unless otherwise stated. The solution comprising the moulded plastic, solvent and or monomer, was then degassed sufficiently to allow free radical polymerization by sparging with nitrogen gas (that is, bubbling nitrogen gas through the solution to degas the solution) and was subsequently sealed. Grafting was then effected by exposing the samples to a dose of γ-irradiation in the range 7 to 12 kGy. The grafted samples are then washed extensively with a suitable solvent to remove absorbed homopolymer and dried to constant weight.

General Staining Methods

For grafted polymers comprising a styryl unit, staining was effected by aminomethylation, followed by development in a THF solution containing 0.1% bromophenol blue. For aminomethylation, the method based on N-(Hydroxymethyl)phthalimide in the presence of an acid catalysis, methane sulfonic acid in a dry DCM solution containing 20% TFA was used. The free amine was then liberated by treatment with a methanolic solution of hydrazine hydrate.

Spectral Analysis

Raman spectroscopy (mapping step: 2 μm across whole section of the sample) and SEM (magnification 7500 times or bigger) was employed in the analysis of these plastic samples.

EXAMPLE 2

Substrate Polymer Characteristics of Polypropylene Polymers

These polymers should have Hardness Shore "D" not less than 60, preferably 60–68; Flexural Modulus values of 800–1200 Mpa and Impact Strength values of 5–12 KJ/m$^2$ at 23° C. The polymers should be injection moulded or extruded using set parameters suitable to generate crystallinity level of 20–50%, as well as a Melt Flow Index not less than 1 and preferably 4–14. An example of such a polymer is commercially available under the trade name of "PMA6100" by Montel. In the following examples, the plastic was injection moulded into 0.35 mm-thick discs, unless otherwise stated.

EXAMPLE 3

Physical Stress Means (a) Heat treatment with hot wire: A stainless steel wire (ca. 0.5 mm in diameter) was heated in a flame until it was red hot. The hot wire was then brought into contact with the plastic sample, which consequently melted. The heating time was varied, and ranged from a very short exposure (touch and immediate withdrawal) to 10 seconds in duration.

(b) Stretching: The ends of the plastic sample were clamped in a universal mechanical testing machine (Instron), and the plastic sample extended under the force of the Instron until the sample broke. The sample was extended at a rate of 1 cm per minute.

(c) Twisting: One end of the plastic sample was clamped in a vice. The exposed end was gripped strongly with a pair of pliers and a rotational force applied. After two revolutions, the sample failed, and afforded a twisted mass of plastic at either end of the sample.

(d) Cutting: The plastic sample was cut with a wire cutting device.

(e) Scratching: A plastic sample was scratched with a stainless steel probe.

(f) Indenting: A stainless steel probe was forced into a plastic sample to afford an indented hole in the sample.

(g) Bending: A plastic sample was grasped at either end and flexed 90°. Further flexing back and forth through 180° was also carried out.

(h) Compressing A plastic sample was clamped in a vice and pressure applied which resulted in the sample flattening out.

(i) Flaming: A plastic sample was placed in a vice and flame was brought into close proximity to the sample. Within seconds, the gloss level on the plastic sample had faded to a mat-like level.

EXAMPLE 4

Grafting onto Polypropylene in a Single Solvent Without Physical Stress Means (a) Grafting onto Polypropylene PAM6100

A plastic sample, which displayed the substrate polymer characteristics described above in Example 2, was placed in a single solvent. Styrene monomers were then added to afford monomer concentrations in the single solvent as outlined in Table 1, below. The mixture was then treated to the grafting conditions outlined above in Example 1, which resulted in the outcomes described below in Table 1 and represented graphically in FIG. 1.

TABLE 1

Grafting onto Polypropylene PMA6100 in a Single Solvent Without Physical Stress Means

| Solvent | Styrene Monomer Concentration (v/v %) |
| --- | --- |
| Dichloromethane | 20, 30 & 40 |
| Methanol | 20, 30 & 40 |
| Ethanol | 20, 30 & 40 |
| Iso-Propanol | 20, 30 & 40 |
| Toluene | 20, 30 & 40 |
| Hexane | 20, 30 & 40 |
| Cyclohexane | 20, 30 & 40 |
| Tetrahydrofuran | 20, 30 & 40 |

In summary, solvents such as methanol, ethanol and isopropanol afforded uniform grafting coverage, whereas solvents such as methylene chloride, hexane and tetrahydrofuran only afforded a background level of staining.

(b) Grafting onto Polypropylene VM6100K

In this case, the plastic samples displayed the following substrate polymer characteristics:

Hardness Shore "D" not less than 60, preferably 60–68;
Flexural Modulus values of 800–1200 Mpa; and
Impact Strength values of 5–12 KJ/m$^2$ at 23° C.

The polymers were injection moulded or extruded using set parameters suitable for generating a crystallinity level of 20–50%, as well as a Melt Flow Index not less than 1 and preferably 3–30.

Figure 2A:
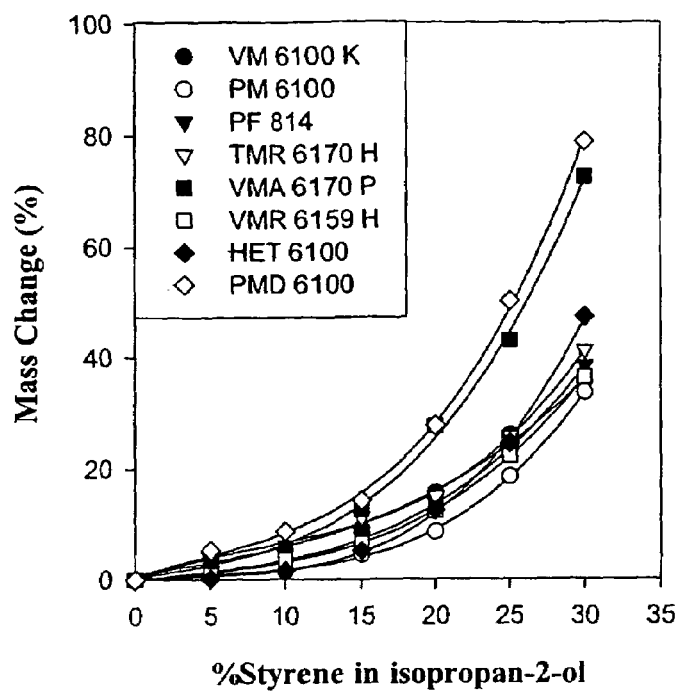
FIGS. 2A, 2B and 2C are graphical representations showing results of grafting of styrene monomers onto particular polypropylenes having defined characteristics, in different concentrations of a number of single solvents. In each case, the following polypropylenes were grafted directly in 5%, 10%, 15%, 20%, 25% and 30% of the particular solvent: VM6100, PM6100, PF814, TMR6170H, VMA6170 P, VMR6159H, HET6100, PMD6100 and PMA6100. Grafting proceeded at 1.62 KGy/h for 400 minutes at room temperature. A: grafting styrene monomer in methanol; B: grafting styrene monomer in iso-propanol; C: grafting styrene monomer in PEG 600.
Figure 2B:
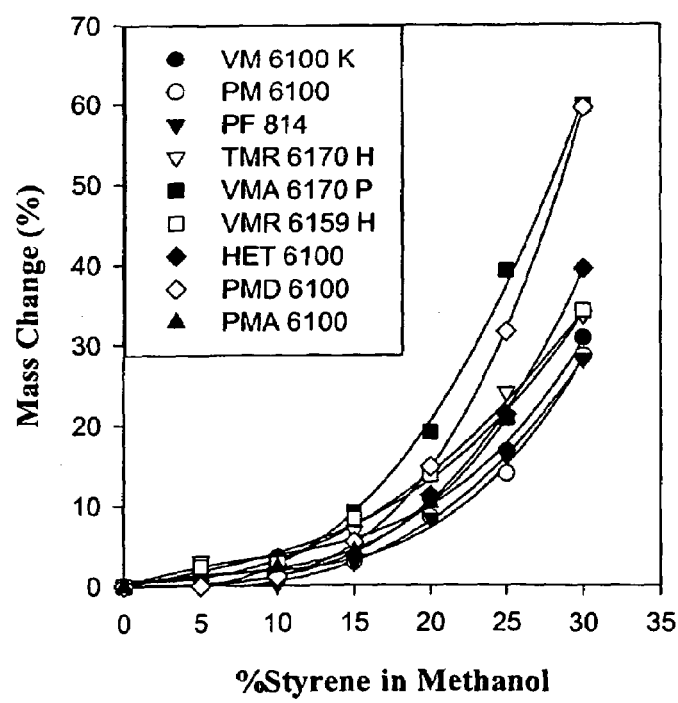
Figure 2C:
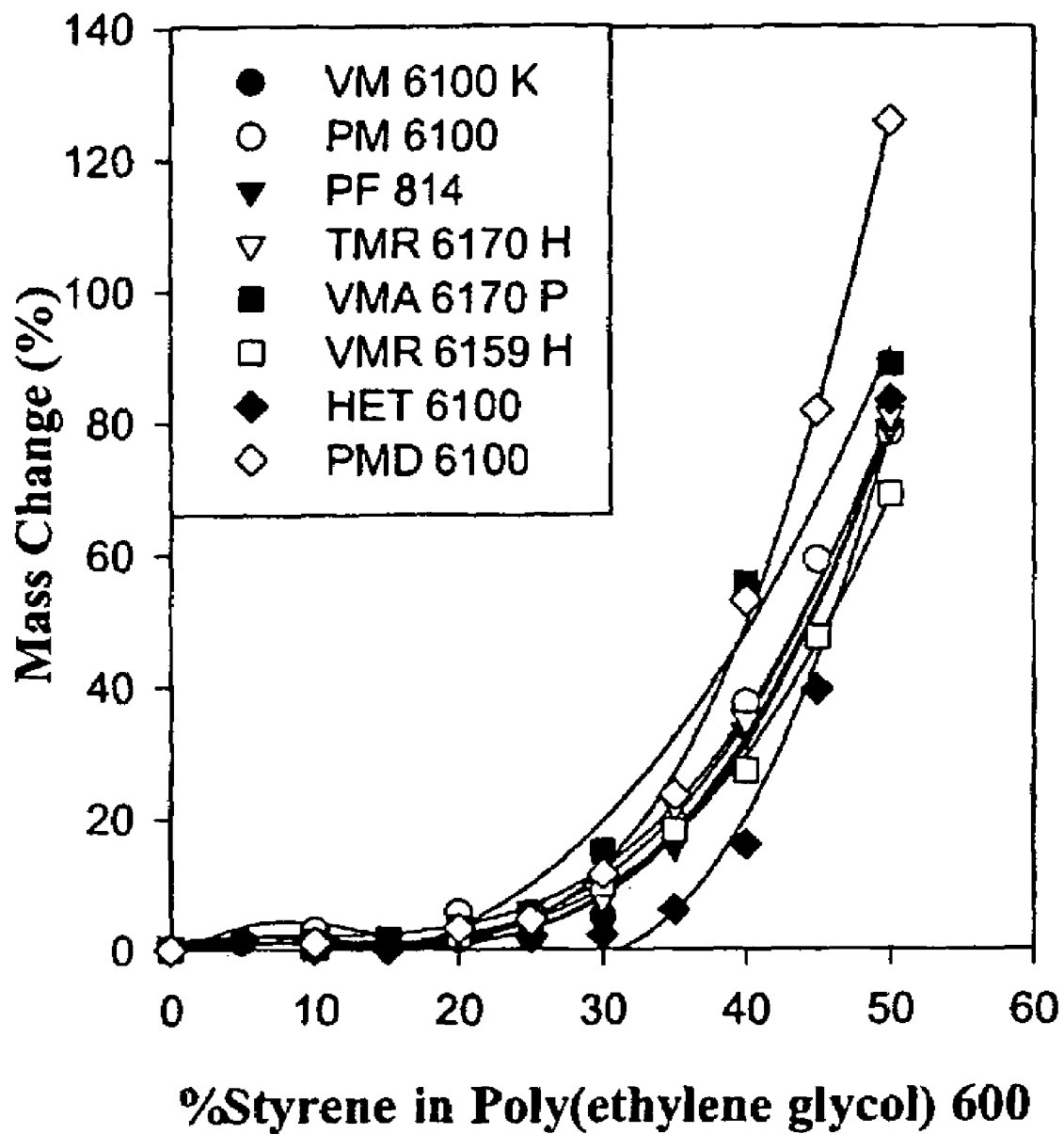

Plastic was injected moulded into 0.35 mm-thick discs, which were placed in a single solvent. Styrene monomer was then added to afford a monomer concentration in the single solvent as outlined in Table 2, below. The mixture was then treated to the grafting conditions outlined above in Example 1, which resulted in the grafted outcomes represented graphically in FIGS. 2A, B and C, for methanol, isopropanol and PEG 600, respectively.

Examples of polymers having such characteristics include the following trade names: VM6100K, PM 6100, PF 814, TMR 6170H, VMA 6170P, VMR 6159H, HET 6100 PMD 6100 and the like. All are commercially available from Basell. The data shown herein are for VM6100K.

TABLE 2

Grafting onto Polypropylene VM6100K in a Single Solvent Without Physical Stress Means

| Solvent | Styrene Monomer Concentration (v/v %) |
| --- | --- |
| Methanol | 5, 10, 15, 20, 25 & 30 |
| Iso-Propanol | 5, 10, 15, 20, 25 & 30 |
| PEG 600 | 5, 10, 15, 20, 25 & 30 |

In summary, these solvents afforded uniform grafting coverage as indicated by continuous staining across the surface of the moulded disc.

EXAMPLE 5

Grafting onto Polypropylene in a Single Solvent With Physical Stress Means

A plastic sample, which displayed the substrate polymer characteristics described above in Example 2, was placed in dichloromethane. Prior to addition of the plastic sample to the single solvent, the plastic sample was treated to the physical stress means described above in Example 3. Styrene monomer was then added to afford a monomer concentration of 40% by volume and the mixture was then treated as outlined above in Example 1, resulting in the outcomes described below:

(a) Heat treatment with hot wire: An intense blue colour was observed only in the regions exposed to the heated rod.
(b) Stretching: An intense blue colour was observed only in the regions where the sample had been stretched.
(c) Twisting: An intense blue colour was observed only in the regions where the sample had been twisted.
(d) Cutting: An intense blue colour was observed only in the regions where the sample had been cut.
(e) Scratching: An intense blue colour was observed only in the regions where the sample had been scratched.
(f) Indenting: An intense blue colour was observed only in the regions where the sample had been indented. Furthermore, the colour appeared to be more intense on the reverse side to that where the pressure had been applied.
(g) Bending: Very pale colouration was observed over the whole of the sample.
(h) Compressing: Very pale colouration was observed over the whole of the sample.
(i) Flaming: Very pale colouration was observed over the whole of the sample.

Furthermore, similar observations were afforded when plastic samples, which displayed the substrate polymer characteristics described above in Example 2 and which had been treated to the physical stress means (d), (e) and (f) described above in Example 3, were placed into single solvents such as tetrahydrofuran, hexane and cyclohexane.

EXAMPLE 6

Grafting onto Polypropylene Surfaces Displaying Uneven Hardnesses

The Atomic Force Microscopy (AFM) method was employed to image a plastic sample, having the characteristics described in Example 2 above, injection moulded into 0.35 mm-thick discs.

The method is performed as follows. An atomically sharp tip is scanned over a surface with feedback mechanisms that enable the piezo-electric scanners to maintain the tip at a constant force (to obtain height information), or height (to obtain force information) above the sample surface. Tips are typically made from $Si_3N_4$ or Si, and extend down from the end of a cantilever. The nanoscope AFM head employs an optical detection system in which the tip is attached to the underside of a reflective cantilever. A diode laser is focused onto the back of a reflective cantilever. As the tip scans the surface of the sample, moving up and down with the contour of the surface, the laser beam is deflected off the attached cantilever into a dual element photodiode. The photodetector measures the difference in light intensities between the upper and lower photodetectors, and then converts to voltage.

Feedback from the photodiode difference signal, through software control from the computer, enables the tip to maintain either a constant force or constant height above the sample. In the constant force mode, the piezo-electric transducer monitors real time height deviation. In the constant height mode, the deflection force on the sample is recorded. The latter mode of operation requires calibration parameters of the scanning tip to be inserted in the sensitivity of the AFM head during force calibration of the microscope.

The primary purpose of these instruments is to quantitatively measure surface roughness with a nominal 5 nm lateral and 0.01 nm vertical resolution, on all types of samples. Depending on the AFM design, scanners are used to translate either the sample under the cantilever or the cantilever over the sample. By scanning in either way, the local height of the sample is measured. Three-dimensional topographical maps of the surface are then constructed by plotting the local sample height versus horizontal probe tip position.

Other parameters include roughness, thermal properties such as thermal conductivity, glass transition temperature (Tg), melting temperature of various phases of a blended polymer measured down to the nanometer scale, surface profiles and magnetic field mapping as well as dynamic surface properties.

Figure 3A:
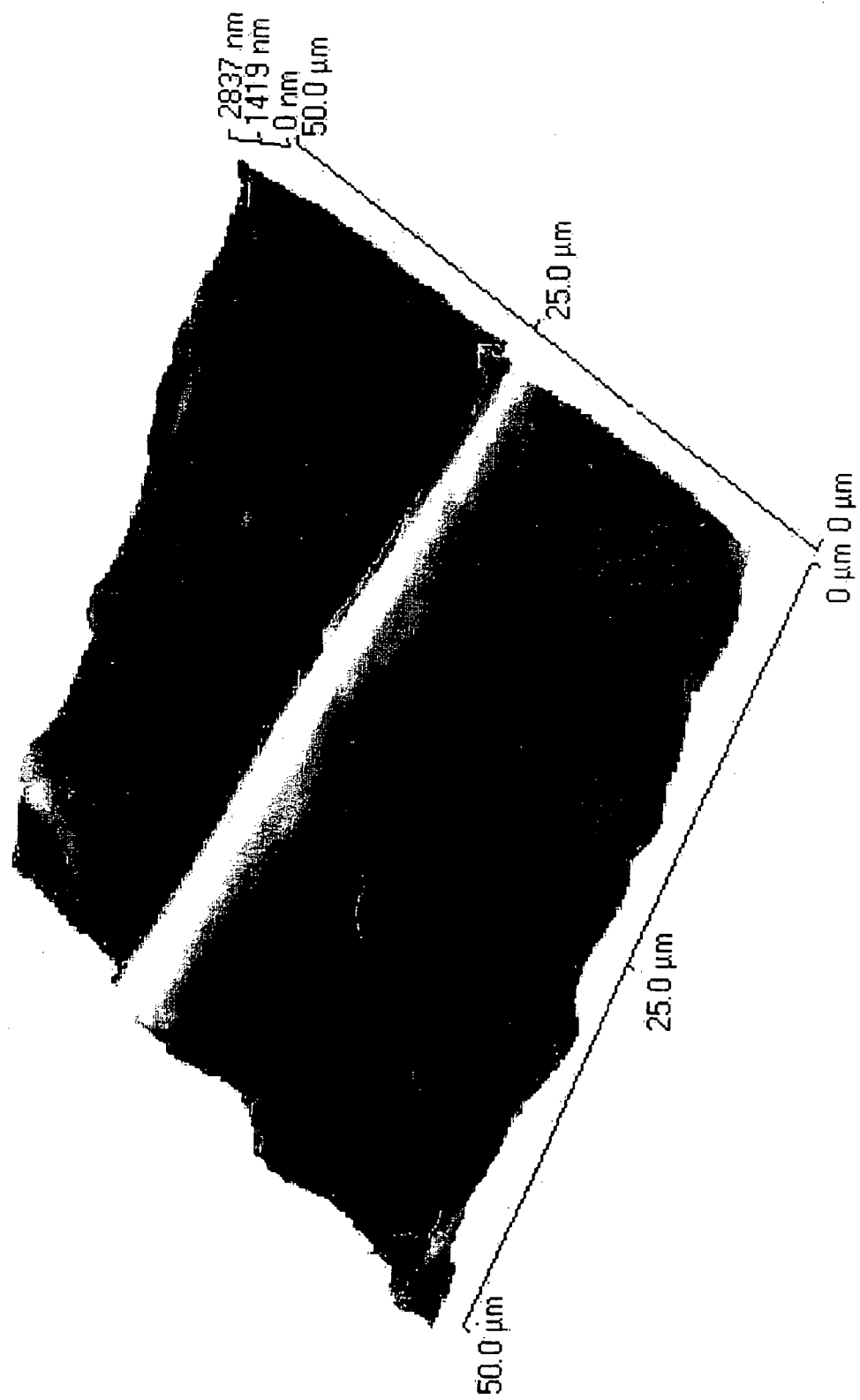
FIGS. 3A and 3B are photographic representations of Atomic Force Microscopy (AFM) images of a polymer as described in Example 2 herein (PMA), before (A) and after (B) treatment with styrene monomer in 20% methanol.
Figure 3B:
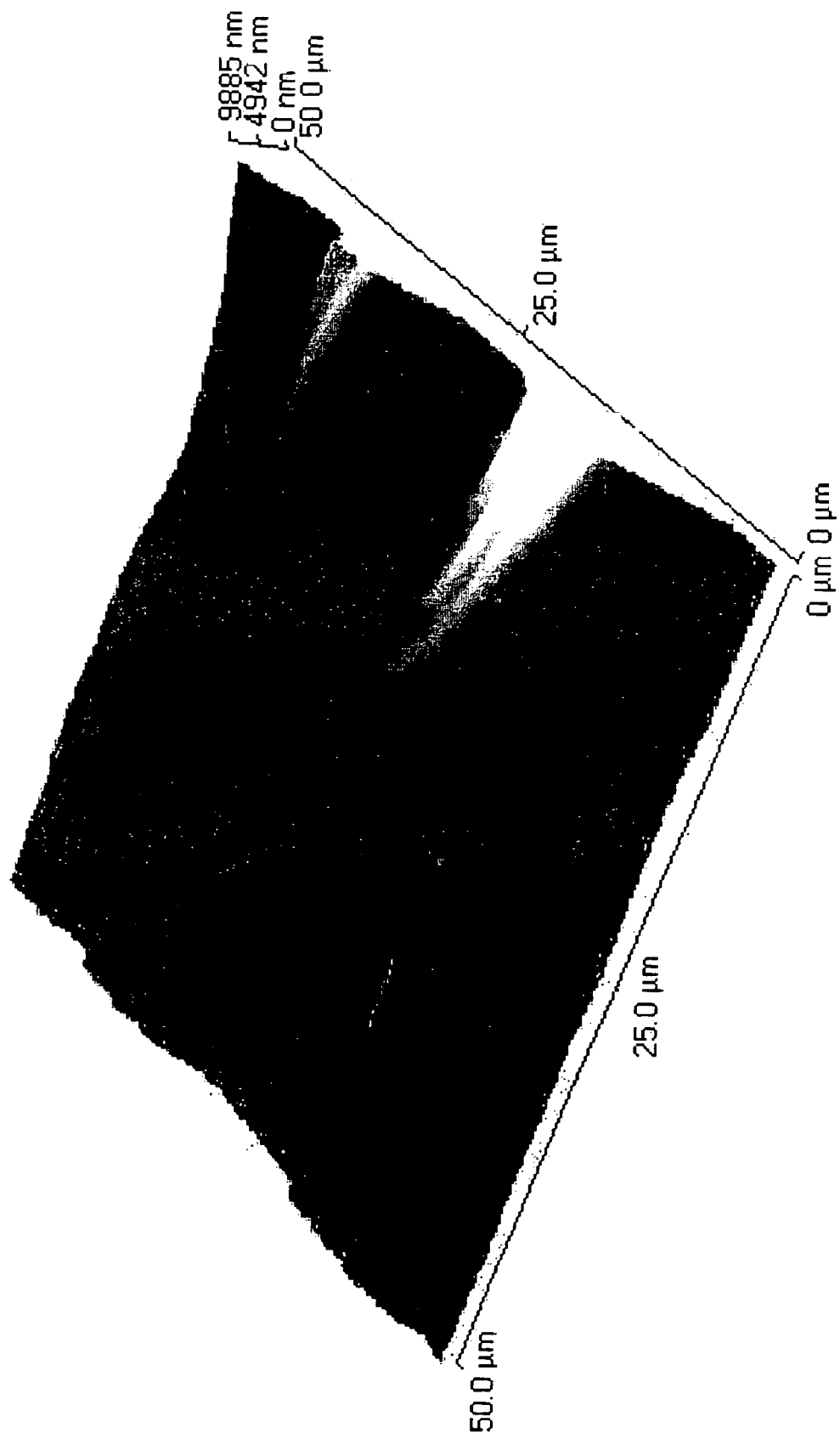

In the present example, the 3-micron features observed are the result of the moulding process, as may be seen in FIG. 3. The flex modulus across these features was not constant and was observed to be lower on the raised portions of the surface compared to the lower valleys.

The AFM method was further employed to image a plastic sample, having the characteristics described in Example 2, above, injected moulded into 0.35 mm-thick discs that were then placed in a single solvent, methanol. Styrene monomer was added to afford a monomer concentration in the single solvent of 20% by volume. The mixture was then treated to the grafting conditions outlined above in Example 1.

An image of the grafted outcome is reproduced in FIG. 3. As can be seen from the image in FIG. 3, 9-micron features were detected. However, the coating preferentially grafted to the raised portions of the moulded article, which displayed a lower flex modulus than the surrounding valley. This example shows another form of "Physical Stress Means", introduced at the stage of moulding of the article. Furthermore, such ordered Physical Stress Means may be engineered into the mould to afford array or pattern designs on the surface of a moulded article. These engineered features have different propensities to be grafted by the chosen grafting method.

EXAMPLE 7

Substrate Polymer Characteristics of Fluoropolymers

The class of fluorinated polymers used in this application was PTFE copolymer with a side chain consisting of PFA. The preferred level of copolymerization was 5–20% and the crystallinity of these classes of polymers was 20–45%. Fluoropolymers of the type described are commercially available under the trade names of FEP5100 (F5), PFA340 (P3), HPJ 420 (P4), THV 500 (P5), and PFA9935 (P9) and are referred to by their abbreviations in the following text.

EXAMPLE 8

Figure 4:
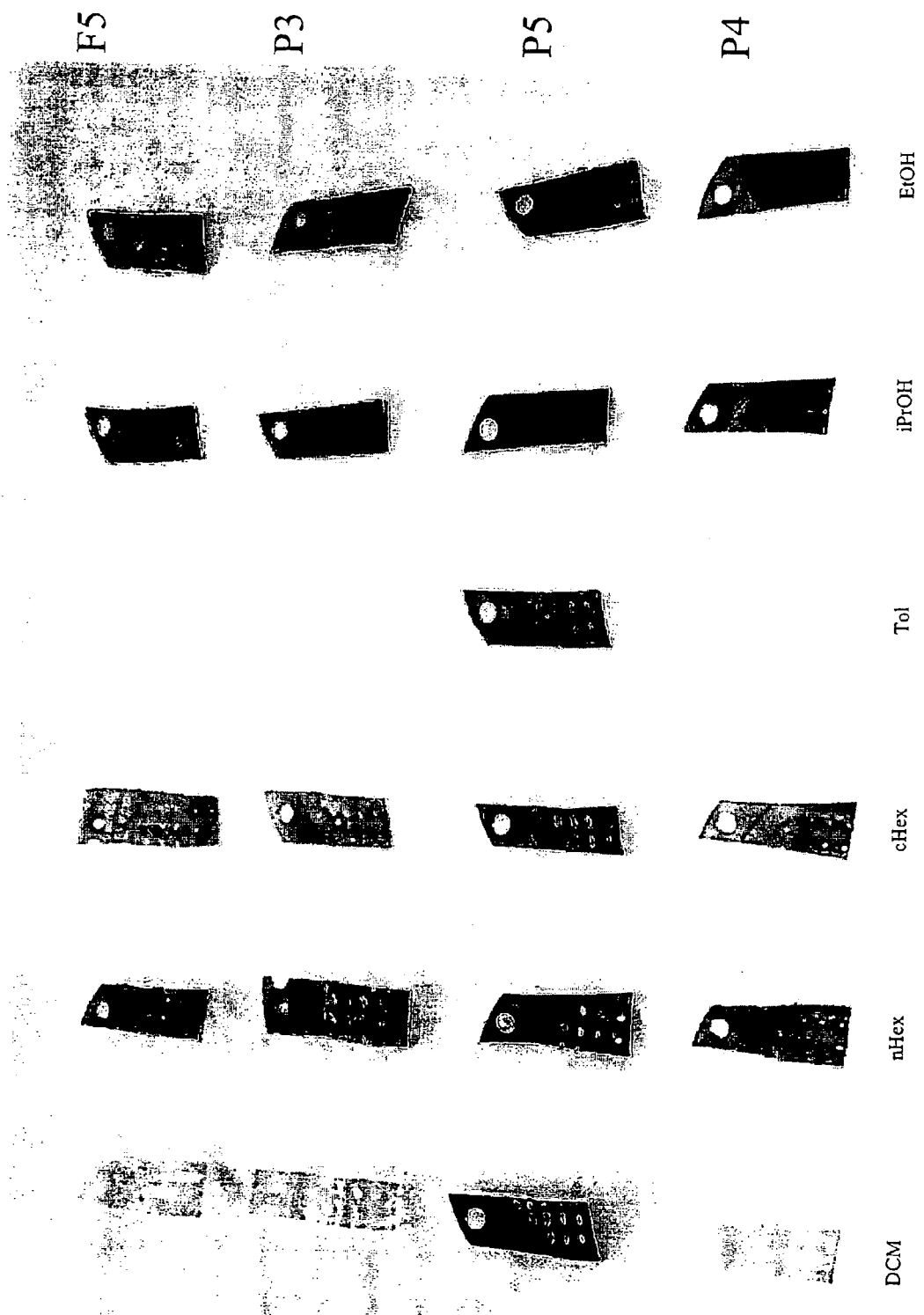
FIG. 4 is a photographic representation showing staining outcomes from various fluoropolymers grafted in 20% styrene.
Figure 5:
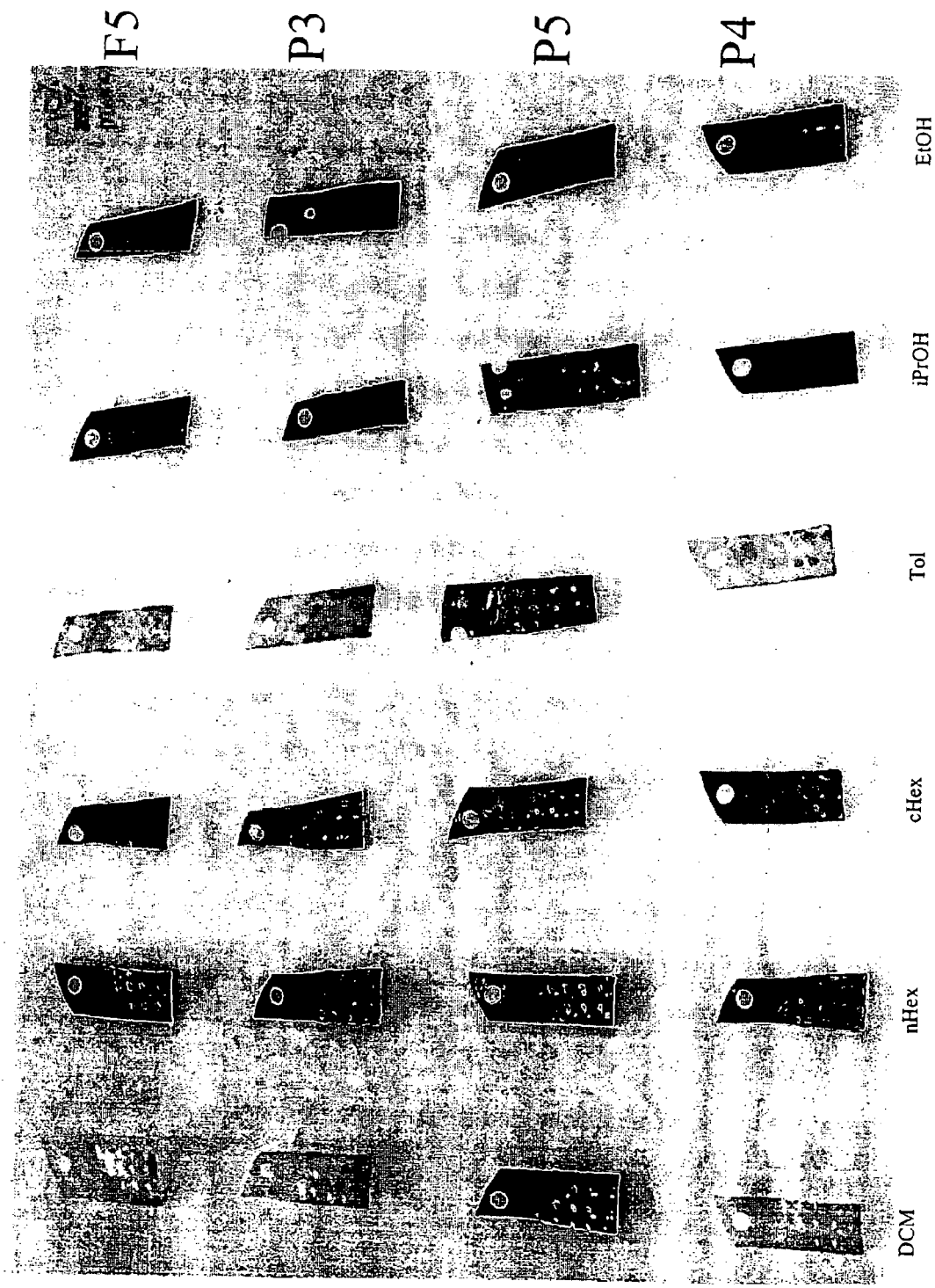
FIG. 5 is a photographic representation showing staining outcomes from various fluoropolymers grafted in 40% styrene.

Grafting onto Fluoropolymers in a Single Solvent Without Physical Stress Means A number of fluoropolymers, which display the substrate polymer characteristics described above in Example 7 and labelled as F5, P3, P5, and P4, were placed in a single solvent of the type DCM, MeOH, EtOH, iPrOH, Toluene, n-Hexane, or cyclo-Hexane, with varying styrene monomer concentration (20–60%). The solutions were then treated to the standard grafting conditions described in Example 1 above, and the outcomes can be seen in FIGS. 4 and 5. The results exemplify typical grafting outcomes for the above solvents comprising 20 and 40% styrene monomer, respectively. Methanol (not depicted in FIGS. 4 and 5) also returns strong colouration for all samples, at both monomer concentrations.

EXAMPLE 9

Grafting onto Fluoropolymers in a Single Solvent With Physical Stress Means

Figure 6:
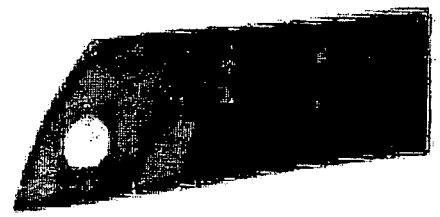
FIG. 6 is a photographic representation showing examples of specific staining as a result of "induced stress" for various fluoropolymers F5 and F4, grafted in 20% styrene.
Figure 6:
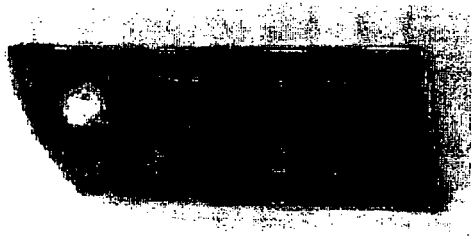
Figure 6:
Figure 6:
Figure 6:

A plastic sample, which displays the substrate polymer characteristics described above in Example 7, is placed in a single solvent. The single solvent employed was identified in Example 8, above, as a single solvent not to afford uniform grafting on the plastic sample. Furthermore, prior to addition of the plastic sample to the single solvent, the plastic sample was treated to the physical stress means (d), (e) and (f) described above in Example 3. Styrene monomer was then added to afford a monomer concentration in the single solvent of 20% and 40% by volume. The mixture was then treated to the grafting conditions outlined above in Example 1. For example, fluoropolymers P4 and F5 afforded stronger grafting responses to the areas treated with the physical stress means than the areas surrounded by solvents such as cyclohexane, isopropanol and ethanol. The results for activation by physical stress means (e) are shown in FIG. 6.

EXAMPLE 10

Grafting onto Fluoropolymers in a Single Solvent With Sequential Physical Stress Means A plastic sample, which displays the substrate polymer characteristics described above in Example 7, in particular P9, is placed in dichloromethane. Prior to addition of the plastic sample to the single solvent, the plastic sample was treated to the physical stress means (f) described above in Example 3. Styrene monomer was then added to afford a monomer concentration in the single solvent of 30% and 40% by volume. The mixture was then treated to the grafting conditions outlined above in Example 1, and strong grafting responses were achieved only on the regions of the plastic that had been subjected to a physical stress means, in accordance with Example 9. These post-grafted samples were then treated by physical stress means in a different region of the sample to that of the initial treatment, and the γ-irradiation was repeated, in accordance to Example 1. Strong grafting responses were then found at these subsequent activated sites.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

BIBLIOGRAPHY

Patel et al., *DDT* 1(4): 134–144, 1996.
Rohr, *Angew. Int. Ed. Engl.* 34: 881–884, 1995.
Needels et al., *Proc. Natl. Acad. Sci. USA* 90: 10700–10704, 1993.
Merrifield, *J. Amer. Chem. Soc.* 35: 2149–2156, 1963.

The invention claimed is:

1. A method for generating a hybrid polymer having first and second and optionally further polymers, said method comprising subjecting said first polymer or a sub-surface region thereof to sufficient physical stress means selected from the group consisting of one or more of stretching, twisting, cutting, scratching, indenting, bending, compressing, heating, flaming, and ejection from a mould, to enable said first polymer or its regions to be capable of acting as a substrate polymer for the grafting of said same and/or one or more other polymers or monomeric precursor forms thereof under radical conditions, contacting the treated first polymer with the second and optionally further polymers or monomeric precursor forms thereof, and subjecting same to conditions sufficient for the second and optionally further polymers or monomeric precursor forms thereof to graft to said first polymer or regions thereof under radical conditions.

2. The method of claim 1, wherein the physical stress means enhances or otherwise promotes the capability of hybrid formation.

3. The method of claim 1, wherein said first polymer, under defined conditions, is incapable of hybrid formation until it is subjected to the physical stress means.

4. The method of claim 1 or 2 wherein said first and second and optionally further polymers compnse a copolymer or other form of multi-polymeric material.

5. The method of claim 4, wherein the copolymer or other form of multi-polymeric material comprises a blend of polymers.

6. The method of claim 1, wherein said first polymer is a fluoropolymer.

7. The method of claim 1, wherein said first polymer is a polypropylene.

8. The method of claim 1, wherein said first polymer or a surface or sub-surface region thereof comprises the following properties:
a Hardness Shore "D" of from about 60 to about 80;
a Flexural Modulus Value of from about 600 to about 2000 Mpa;

an Impact Strength Value of from about 4 to about 20 kJ/m² at 23° C.;
a crystallinity level of from about 10 to about 70%; and
a Melt Flow Index of from about 1 to about 30.

9. The method of claim 1, wherein discrete regions of said first polymer are subjected to the physical stress means to enable said first polymer to be capable of acting as a substrate polymer for said grafting to occur in an array format.

10. The method of claim 9, wherein the array format comprises an ordered pattern.

11. The method of claim 9, wherein the array format comprises a random pattern.

12. The method of claim 10 or 11, wherein the pattern is homogenous.

13. The method of claim 10 or 11, wherein the pattern is heterogenous.

14. The method of claim 1, wherein the conditions sufficient for the second and optionally further polymers or monomeric precursor forms thereof to graft comprise conditions under which two or more polymers associate by chemical bond or linkage.

15. The method of claim 14, wherein graft conditions comprise the formation of radicals on the first polymer to initiate polymerization of monomeric units.

16. A hybrid polymer comprising a first polymer in hybrid formation with a second or optionally further polymers generated by a method of claim 1.

17. The hybrid polymer of claim 16, wherein the second or optionally further polymers are defined by the formula:

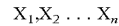

wherein $X_1, X_2 \ldots X_n$ may be the same or different and each is a polymer grafted to the surface or sub-surface of said first polymer at discrete regions and wherein the physical stress means facilitates grafting of each of said $X_1, X_2 \ldots X_n$ to said surface or sub-surface of said first polymer or regions thereof wherein each of said $X_1, X_2 \ldots X_n$ comprises a chemical entity bound to a reactive group according to the formula:

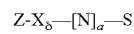

wherein
Z is a reactive group on the first polymer;
$X_\delta$ is any one of $X_1, X_2 \ldots X_n$;
N is a spacer and is optionally present as a 0 or 1; and
S is a chemical entity.

* * * * *